United States Patent Office 3,425,998
Patented Feb. 4, 1969

3,425,998
LEAD SILICOFLUORIDE AS A TRANS-
ESTERIFICATION CATALYST
Mary J. Koch, Drexel Hill, and John A. Price, Swarthmore, Pa., assignors to FMC Corporation, Philadelphia, Pa., a corporation of Delaware
No Drawing. Filed Oct. 13, 1966, Ser. No. 586,354
U.S. Cl. 260—75           2 Claims
Int. Cl. C08g 17/08

ABSTRACT OF THE DISCLOSURE

Process of preparing filament-forming polyethylene terephthalate comprising carrying out a transesterification reaction between dimethyl terephthalate and ethylene glycol in the presence of lead silicofluoride as a transesterification catalyst to form a polyester prepolymer and then polycondensing the said prepolymer in the presence of a polycondensation catalyst.

---

This invention relates to a method of preparing synthetic filament-forming polyester resin. More particularly, it relates to a particular method for preparing polyethylene terephthalate resin suitable for melt spinning into filaments through the use of a transesterification catalyst.

It is known that filament-forming polyesters can be made from a dialkyl terephthalate and a diol, such as dimethyl terephthalate and ethylene glycol respectively, by first combining such ingredients and subjecting them to an ester-interchange or transesterification reaction in the presence of a transesterification catalyst at elevated temperature and atmospheric pressure to form a polyester prepolymer which may be described as being comprised principally of bis(2-hydroxyethyl)terephthalate. The polyester prepolymer is then polycondensed at higher temperature and under reduced pressure in the presence of a polycondensation catalyst to form the filament-forming polyester resin.

Heretofore, various materials have been suggested as catalysts for the ester-interchange reaction between dimethyl terephthalate and ethylene glycol. However, a large portion of the suggested catalysts are not entirely satisfactory because, in many instances, they do not act to form prepolymers and polyester resins which possess sufficiently low carboxyl contents. In general, a polyethylene terephthalate resin suitable for melt spinning into filaments should have a carboxyl content value of below 50 equivalents per million grams (eq./$10^6$ gr. or meq./kg.). However, it is desirable to manufacture polyester resins which have carboxyl content values as close to zero as possible because there is a generally recognized direct relationship between the carboxyl content of the polyester resin and the thermal, hydrolytic, and ultra-violet light stability of the filaments produced therefrom. In general, the higher the carboxyl content of the polyester resin, the less thermal, hydrolytic, and ultra-violet light stability is possessed by the resulting filaments. Therefore, obviously, it is desirable to produce polyester filaments and fibers that possess a very low carboxyl content in view of their end use in such things as wash and wear clothing and the like. Additionally, a polyethylene terephthalate resin suitable for such use should have a melting point of at least about 258°–260° C., and an intrinsic viscosity of not less than about 0.60.

Further, from a commercial standpoint, it is essential that the polyester resin be produced in the shortest possible time and the desired degree of polymerization be obtained. One of the ways of evaluating the effectiveness of a transesterification catalyst is by measuring the "half-time" of the transesterification catalyst. The "half-time" is defined as the time necessary for the first one-half of the theoretical amount of methyl alcohol that will be produced during the transesterification reaction to distill from the reaction mixture. It is desirable that the "half-time" be as short as possible, but in any instance, be less than about 60 minutes.

It is an object of this invention to prepare polyethylene terephthalate resin suitable for melt extrusion into processable filaments through the use of a transesterification and polycondensation process.

It is another object of the present invention to provide an improved method for accelerating the transesterification reaction between ethylene glycol and dimethyl terephthalate in order to produce a polyethylene terephthalate resin suitable for preparing polyethylene terephthalate fibers.

These and other objects are accomplished in accordance with the present invention which involves a method for preparing filament-forming polyethylene terephthalate wherein dimethyl terephthalate and ethylene glycol are transesterified and the resulting transesterified product is polycondensed in the presence of a condensation catalyst, the improvement comprising carrying out the transesterification reaction in the presence of a catalytic amount of lead silicofluoride.

Generally, concentrations of the present transesterification catalyst in the range of from about 0.01% to about 0.20%, based on the weight of the dimethyl terephthalate in the subject dimethyl terephthalate-ethylene glycol reaction mixture, is used. Higher or lower concentrations of the present catalyst can also be used. However, when concentrations less than the above are used, their catalytic effect is generally reduced, whereas if greater concentrations than this are used, no further improvement in the present method or desired product is obtained. Usually, it has been found that from about 0.02% to about 0.1% of the present lead silicofluoride, based on the weight of dimethyl terephthalate in the reaction mixture, is preferred to produce the linear polyester resins of the present method.

In general, the preparation of filament-forming polyesters of the present invention via the ester-interchange reaction is carried out with molar ratio of ethylene glycol to dimethyl terephthalate of from about 1:1 to about 15:1, but preferably from about 1.5:1 to about 2.6:1. The ester-interchange reaction is generally carried out at atmospheric pressure in an inert atmosphere, such as nitrogen, initially at a temperature range of from about 125° C. to about 250° C. but preferably between about 150° C. and 200° C., in the presence of an ester-interchange catalyst. During this first stage, methyl alcohol is evolved and is continually removed by distillation. After a reaction period of about two hours, the temperature of the reaction mixture is raised from about 200° C. to about 300° C. over about a one hour period in order to complete the reaction and distill of excess glycol which has been produced and induce polycondensation. The main and desired product of the ester-interchange reaction is the preploymer comprised principally of bis(2-hydroxyethyl)-terephthalate. The second stage or polycondensation step of the present method is generally achieved under reduced pressure within the range of from about 225° C. to about 325° C. for about 3–5 hours. It is preferable to carry out both the first and second stage of the present method under agitation.

The polycondensation step of the present method is generally accomplished through the addition of a suitable catalyst, for example, antimony trioxide, manganous acetate, zinc acetylacetonate, and the like. The polycondensation catalyst may be added to the present reaction mixture before initiating the ester-interchange reaction between the ethylene glycol and dimethyl terephthalate or after the product thereof is formed. The polycondensation catalysts are generally employed in amounts ranging from about 0.005 to about 0.5%, based on the total weight of reactants.

While the present invention has been generally described with respect to the preparation of polyethylene terephthalate, it is also within the scope of the present invention to prepare copolyesters containing various ratios of terephthalic acid esters with esters of other dibasic acids such as isophthalic acid using lead silicofluoride as a transesterification catalyst.

The following example of a preferred embodiment of the present invention will further serve to illustrate the present invention. All parts are by weight, unless otherwise indicated.

EXAMPLE

A mixture comprising 600 grams of dimethyl terephthalate, 396 mls. of ethylene glycol and 0.24 gram of lead silicofluoride ($PbSiF_6$) was charged into a reaction vessel equipped with a nitrogen inlet, a distillation arm, heating means, and stirring means. The reaction mixture was agitated and heated at atmospheric pressure to about 197° C. over a period of about 30 minutes under a nitrogen blanket whereby by-product methyl alcohol was distilled off. The reaction mixture was held at about 197° C. for about two hours. Then, the temperature of the reaction mixture was allowed to rise in order to distill off any remaining by-product comprising methyl alcohol and ethylene glycol, and from the desired polyester prepolymer product. After about 30 minutes, the temperature had risen to 230° C. at which time the prepolymer product was cooled under a nitrogen blanket.

The "half-time" of the lead silicofluoride catalyst was 32 minutes and the prepolymer product had a carboxyl content value of 2.7 eq./$10^6$ gr.

50 grams of the above prepolymer was combined with 0.02 gram of antimony trioxide in a reaction vessel equipped with a nitrogen inlet, a vacuum source, a distilling arm, stirring means, and heating means. The pressure within the reaction vessel was reduced to from about 0.1 to about 0.05 mm. of mercury at 285° C. under a nitrogen blanket and the reaction mixture was agitated under these conditions for about three hours to bring about the polycondensation of the prepolymer and formation of the polyester resin.

The resulting polyester resin had an intrinsic viscosity of 0.913, a melting point of about 259°–261° C. and a carboxyl content value of 9.9 eq./$10^6$ gr.

The results in the above example indicate that the presence of lead silicofluoride during the transesterification reaction, in general, facilitates the preparation of and improves the prepolymer and in turn the polyester product. Lead silicofluoride accelerated the transesterification reaction as indicated by the "half-time" of the catalyst. The low carboxyl content of the prepolymer indicates the lack of undesirable side reactions during the transesterification process. Further, the polyester product had a high melting point, a high molecular weight, as indicated by its intrinsic viscosity, and a desirable, very low carboxyl content value.

It will be apparent that many various different embodiments of this invention may be made practicing this invention without departing from the spirit and scope thereof, and therefore, it is not intended to be limited except as indicated in the appended claims.

We claim:

1. In a process for the preparation of filament-forming polyethylene terephthalate resin wherein dimethyl terephthalate and ethylene glycol are transesterified and the resulting transesterified product is polycondensed in the presence of a condensation catalyst, the improvement comprising carrying out the transesterification reaction in the presence of a catalytic amount of lead silicofluoride as a transesterification catalyst.

2. The process of claim 1 wherein the lead silicofluoride is present in an amount of from about 0.01% to about 0.20%, based on the weight of the dimethyl terephthalate in the reaction mixture.

References Cited

UNITED STATES PATENTS

| | | | |
|---|---|---|---|
| 3,228,913 | 1/1966 | Nesty et al. | 260—75 |
| 3,346,542 | 10/1967 | Koepp et al. | 260—75 |
| 3,356,641 | 12/1967 | Roedel et al. | 260—75 |

WILLIAM H. SHORT, *Primary Examiner.*

L. P. QUAST, *Assistant Examiner.*

U.S. Cl. X.R.

260—475